(12) United States Patent
Tanaka

(10) Patent No.: US 8,135,270 B2
(45) Date of Patent: Mar. 13, 2012

(54) IMAGING DEVICE AND IMAGING METHOD

(75) Inventor: Koichi Tanaka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/842,187

(22) Filed: Jul. 23, 2010

(65) Prior Publication Data

US 2011/0019989 A1 Jan. 27, 2011

(30) Foreign Application Priority Data

Jul. 24, 2009 (JP) ................................ 2009-173260

(51) Int. Cl.
*G03B 13/00* (2006.01)
(52) U.S. Cl. ....................................................... 396/104
(58) Field of Classification Search .................. 396/104
See application file for complete search history.

(56) References Cited

U.S. PATENT DOCUMENTS

| | | | |
|---|---|---|---|
| 5,740,337 A | 4/1998 | Okino et al. | |
| 6,519,358 B1 * | 2/2003 | Yokoyama et al. | 382/154 |
| 7,224,831 B2 * | 5/2007 | Yang et al. | 382/154 |
| 7,372,987 B2 * | 5/2008 | Tokuhashi et al. | 382/154 |
| 7,386,226 B2 * | 6/2008 | Miyoshi et al. | 396/89 |
| 7,471,809 B2 * | 12/2008 | Miyazaki | 382/107 |
| 7,729,512 B2 | 6/2010 | Nishiyama | |
| 2004/0238718 A1 * | 12/2004 | Washisu | 250/201.2 |
| 2007/0070238 A1 * | 3/2007 | Sugimoto et al. | 348/345 |
| 2007/0248345 A1 * | 10/2007 | Nozaki et al. | 396/123 |
| 2008/0131109 A1 * | 6/2008 | Honjo et al. | 396/123 |
| 2008/0232712 A1 * | 9/2008 | Matsui et al. | 382/277 |
| 2008/0259176 A1 * | 10/2008 | Tamaru | 348/222.1 |
| 2011/0012998 A1 * | 1/2011 | Pan | 348/47 |

FOREIGN PATENT DOCUMENTS

| | | | |
|---|---|---|---|
| JP | 7-95623 A | 4/1995 | |
| JP | 4177826 B2 | 11/2008 | |

* cited by examiner

*Primary Examiner* — W. B. Perkey
*Assistant Examiner* — Linda B Smith
(74) *Attorney, Agent, or Firm* — Birch, Stewart, Kolasch & Birch, LLP (57) ABSTRACT

When the total number of pairs of a feature point and a corresponding point, which are detected from a first image data and a second image data that are in focus, respectively, exceeds a predetermined threshold th1, a parallax histogram generation unit is controlled to generate a histogram of parallax amount, and a representative parallax information determination unit is controlled to determine an amount of representative parallax from bins in the histogram of parallax amount. According to a search direction determined by a focus adjustment unit, the representative parallax information determination unit determines significance of each bin in the histogram based on whether a frequency f of the bin is greater than a predetermined threshold th2. The representative parallax information determination unit determines the amount of representative parallax based on amounts of parallax in the significant bin. A stereoscopic display control unit determines clipping ranges of the first image data and the second image data based on the determined amount of representative parallax.

10 Claims, 7 Drawing Sheets

FEATURE POINT

FIG.3B

CORRESPONDING POINT

IMAGING DEVICE AND IMAGING METHOD

BACKGROUND OF THE INVENTION

1. Field of the Invention

The present invention relates to an imaging device provided with a plurality of optical systems having parallax with each other.

2. Description of the Related Art

According to Japanese Patent No. 4177826, a parallax distribution (a histogram) is generated from first and second images by extracting feature points and detecting their corresponding points. Based on the distribution, a moving object is detected.

According to Japanese Patent Application Laid-Open No. 07-95623, focus of each of left and right imaging lenses is controlled by an auto focus (AF) drive circuit. Output from a CCD is written in a memory for electronic zooming. A microcomputer controls a clipping position of a clipping frame for electronic zooming according to AF data proportional to a subject distance. Thereby, a convergence angle is electronically controlled.

In a stereoscopic imaging device provided with a pair of left and right imaging optical systems (or provided with two cameras), an amount of parallax generated between left and right images needs to be adequately adjusted to stereoscopically display the obtained parallax images appropriately. Particularly, for a subject which a photographer intends to photograph as a main subject, it is desirable that an amount of parallax is adjusted to be adequate to reduce too much protrusion and retreat in a stereoscopic image. Conventionally, an amount of parallax has been adjusted by controlling spacing between a pair of imaging optical systems, a distance to the point of intersection of the optical axes (a convergence point), and a convergence angle. However, this adjustment requires the imaging optical systems to be driven mechanically, causing a problem that a structure and controls of the camera are complicated.

According to the technology of Japanese Patent Application Laid-Open No. 07-95623, when an inexpensive lens is used, it is difficult to precisely calculate an actual subject distance by using focus information because of influence of, for example, thermal characteristics, causing an error in adjustment of a convergence angle based on the focal length.

SUMMARY OF THE INVENTION

The object of the present invention is to allow a stereoscopic imaging device to electronically adjust a convergence angle according to a subject in focus.

The present invention provides an imaging device including: an imaging unit performing, by using an imaging element, optoelectronic conversion of a subject image formed via each of a reference optical system and a non-reference optical system, and outputting a plurality of viewpoint images different from each other; a reference focusing evaluation area defining unit defining a reference focusing evaluation area corresponding to one of the viewpoint images which is from the reference optical system; a subject information determination unit determining subject information about whether a distance from the imaging unit to a subject in the reference focusing evaluation area is long or short; a focusing control unit detecting peak positions each of which is a focus position having a local maximum contrast in the reference focusing evaluation area defined by the reference focusing evaluation area defining unit in the viewpoint image from the reference optical system while changing the focus position of the reference optical system, determining an in-focus position corresponding to the subject among the peak positions based on the subject information determined by the subject information determination unit, and moving the focus position of the reference optical system to the determined in-focus position; a feature point extraction area defining unit defining a feature point extraction area corresponding to the viewpoint image from the reference optical system, which has the focus position moved to the in-focus position, based on the reference focusing evaluation area; a feature point extraction unit extracting a feature point from the feature point extraction area defined in the viewpoint image of the reference optical system by the feature point extraction area defining unit; a corresponding point extraction unit extracting a corresponding point corresponding to the feature point, which is extracted by the feature point extraction unit, from the other of the viewpoint images which is from the non-reference optical system; a parallax amount calculation unit calculating an amount of parallax for each pair of the feature point extracted by the feature point extraction unit and the corresponding point extracted by the corresponding point extraction unit; a histogram generation unit generating a histogram, which shows distribution of the amount of parallax for each pair, based on the amount of parallax for each pair of the feature point and the corresponding point which is calculated by the parallax amount calculation unit; a determining unit determining a significant class, which is a class having the amount of parallax corresponding to the subject, based on the subject information determined by the subject information determination unit and a frequency in the histogram generated by the histogram generation unit; and a representative parallax amount determination unit determining an amount of representative parallax based on the significant class determined by the determining unit.

Preferably, the subject information determination unit sets an imaging mode to the subject information, the focusing control unit determines, according to the imaging mode, the search direction, in which the focus position in the reference optical system is changed, to be one of a direction from the closest side to the infinity side and a direction from the infinity side to the closest side, and determines a peak position, which is first detected while the focus position of the reference optical system is changed in the determined search direction, to be the in-focus position, and the determining unit repeats determination of significance of each class in the histogram in the order along the determined search direction based on the frequency of each class, and determines a class, which is first determined to be significant along the determined search direction, to be a significant class.

Preferably, in response to the detection of the significant class, the determining unit stops the determination of significance of each class subsequent to the significant class along the determined search direction.

Preferably, the determining unit determines significance of each class according to whether the frequency of each class exceeds a predetermined threshold or not.

Preferably, when the imaging mode is a portrait mode or a macro mode, the focusing control unit determines that the search direction is a direction from the closest side to the infinity side.

Preferably, when the imaging mode is a landscape mode, the focusing control unit determines that the search direction is a direction from the infinity side to the closest side.

Preferably, the feature point extraction area defining unit defines the feature point extraction area for a part or all of the reference focusing evaluation area.

Preferably, the imaging device further includes: a clipping unit determining a clipping range of the viewpoint image from the reference optical system and a clipping range of the viewpoint image from the non-reference optical system so as to eliminate misalignment between the viewpoint images which is shown as the amount of representative parallax determined by the representative parallax amount determination unit, and clipping images according to the determined clipping ranges; and an output unit outputting a stereoscopic image based on the images clipped by the clipping unit.

The present invention provides an imaging method by which an imaging device which performs, by using an imaging element, optoelectronic conversion of a subject image formed via each of a reference optical system and a non-reference optical system, and outputs a plurality of viewpoint images different from each other, executes the steps of: defining a reference focusing evaluation area corresponding to one of the viewpoint images which is from the reference optical system; determining subject information about whether a distance from the imaging device to a subject in the reference focusing evaluation area is long or short; detecting peak positions each of which is a focus position having a local maximum contrast in the defined reference focusing evaluation area in the viewpoint image from the reference optical system while changing the focus position of the reference optical system, determining an in-focus position corresponding to the subject among the peak positions based on the determined subject information, and moving the focus position of the reference optical system to the determined in-focus position; defining a feature point extraction area corresponding to the viewpoint image from the reference optical system, which has the focus position moved to the in-focus position, based on the reference focusing evaluation area; extracting a feature point from the feature point extraction area which is defined in the viewpoint image of the reference optical system; extracting a corresponding point corresponding to the extracted feature point from the other of the viewpoint images which is from the non-reference optical system; calculating an amount of parallax for each pair of the extracted feature point and the extracted corresponding point; generating a histogram, which shows distribution of the amount of parallax for each pair, based on the calculated amount of parallax for each pair of the feature point and the corresponding point; determining a significant class, which is a class having the amount of parallax corresponding to the subject, based on the determined subject information and a frequency in the generated histogram; and determining an amount of representative parallax based on the determined significant class.

An imaging program for instructing the imaging device to execute the imaging method is also included in the present invention.

According to the present invention, an amount of representative parallax can be determined from a histogram of parallax amount of a subject in a focusing evaluation area. Additionally, based on the amount of representative parallax, misalignment between left and right viewpoint images can be electronically adjusted. Furthermore, a direction for searching a contrast in focus is determined to be same as a direction for determining significance of each class in the histogram of parallax amount. Thereby, a stereoscopic effect of the subject in focus can be adequately adjusted.

DETAILED DESCRIPTION OF THE PREFERRED EMBODIMENTS

Figure 1:
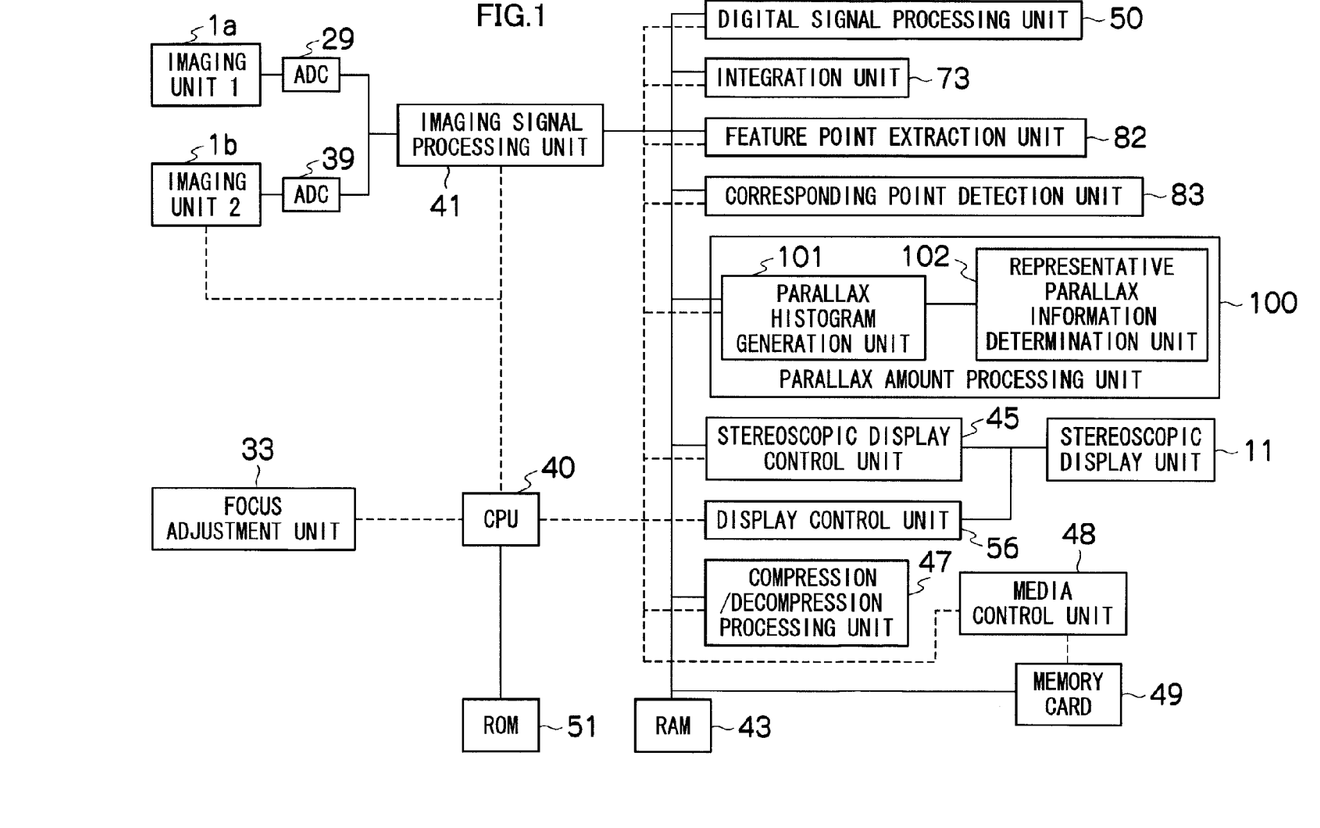
FIG. 1 is a block diagram of a camera.

FIG. 1 shows an electronic configuration of a camera 2. A first imaging unit 1$a$ is provided with a first variable power lens, a first focus lens, a first diaphragm, and a first image sensor, which are arranged along its lens optical axis. Similarly, a second imaging unit 1$b$ is provided with a second variable power lens, a second focus lens, a second diaphragm, and a second image sensor, which are arranged along its lens optical axis.

A CPU 40 moves the first variable power lens along the lens optical axis toward the telephoto side (extending side) or the wide angle side (retracting side) in response to an input operation from a zoom button, which indicates a telephoto or a wide angle zoom direction, and thereby controls the first variable power lens so as to change a focal length (imaging magnification). Moving the first variable power lens toward the telephoto side provides a long focal point and a narrow imaging range. Moving the first variable power lens toward the wide angle side provides a short focal point and a wide imaging range.

The first focus lens is moved along the lens optical axis by a driver controlled by the CPU 40, and thereby the focus is adjusted.

The CPU 40 receives a target zoom direction specified from the zoom button. According to the target zoom direction, the CPU 40 determines a target zoom position. When the target zoom direction is the telephoto direction, the target zoom position is set to the closest zoom step from the current position of the first variable power lens toward the telephoto direction. When the target zoom direction is the wide angle direction, the target zoom position is set to the closest zoom step from the current position of the first variable power lens toward the wide angle direction. The CPU 40 converts the target zoom position into a pulse number indicating a target stop position of the first variable power lens, and makes a driver to actuate the first variable power lens according to the pulse number. The pulse number 0 indicates the home position.

The first image sensor receives light of a subject image formed by the first variable power lens and the first focus lens, and accumulates optical charges corresponding to an amount of the received light in light-sensitive elements. The accumulation and transmission of the optical charges in the first image sensor are controlled by a timing signal (a clock pulse) periodically received from a timing generator (TG). In an imaging mode, image signals for one frame are obtained every predetermined period, and sequentially inputted into a first A/D converter 29. A CCD type or a MOS type solid state imaging device is used as the first image sensor.

The first A/D converter 29 converts the inputted image data from analog to digital. The imaging signals of the first imaging unit 1a are converted into first image data (image data for the right eye) via the first A/D converter 29.

The second imaging unit 1b has the same configuration as the first imaging unit 1a. It is provided with the second variable power lens, the second focus lens, and the second diaphragm which are actuated by drivers under the control of the CPU 40.

Each member of the second imaging unit 1b has the same quality as that of the first imaging unit 1a. The first imaging unit 1a and the second imaging unit 1b are synchronized, and each imaging unit simultaneously takes an image. The first imaging unit 1a and the second imaging unit 1b may not be built in the same camera housing. Each imaging unit may be provided in an individual imaging device.

The second A/D converter 39 has the same configuration as the first A/D converter 29 described above. Imaging signals of the second imaging unit 1b are converted into second image data (image data for the left eye) via the second A/D converter 39.

Each of the first and the second image data outputted from the first and the second A/D converters 29, 39 is inputted into an imaging signal processing unit 41. The imaging signal processing unit 41 performs various imaging processing on each of the first and the second image data, such as gradation conversion, white balance correction, and γ correction. The first and the second image data which have been processed by the imaging signal processing unit 41 and outputted every predetermined period are received by a digital signal processing unit 50.

The digital signal processing unit 50 performs YC conversion on the first image data, and generates luminance signals Y and color-difference (chrominance) signals B-Y, R-Y. The luminance signals and the color-difference signals are temporarily stored in a RAM 43.

The RAM 43 is a working memory which temporarily stores the first and the second image data. When the RAM 43 which already stores the first and the second image data receives next first and second image data of a next period, the already stored first and second image data are overwritten with the newly received first and second image data. The first and the second image data which are repeatedly overwritten and updated every predetermined period in the RAM 43 are referred to as a through image.

A stereoscopic display control unit 45 combines the first and the second image data, which are stored in the RAM 43, into stereoscopic image data which is stereoscopically displayed by a stereoscopic display unit 11. When the stereoscopic display unit 11 is used as an electronic viewfinder in the imaging mode, a display control unit 56 displays the stereoscopic image data, which is combined by the stereoscopic display control unit 45, in the stereoscopic display unit 11 as a through image.

A compression/decompression processing unit 47 compresses the first and the second image data stored in the RAM 43 by a compression scheme such as the JPEG scheme. The RAM 43 is also used as a temporary memory area which is necessary for the compression process. A media control unit 48 stores each of the image data compressed by the compression/decompression processing unit 47 in a memory card 49.

When the first and the second image data thus stored in the memory card 49 are played back and displayed in the stereoscopic display unit 11, each of the image data stored in the memory card 49 is retrieved by the media control unit 48. Each of the image data decompressed by the compression/decompression processing unit 47 is converted into stereoscopic image data by the stereoscopic display control unit 45, and then the stereoscopic image data is played back and displayed in the stereoscopic display unit 11.

A detailed configuration of the stereoscopic display unit 11 is not shown. The stereoscopic display unit 11 is provided with a parallax barrier display layer on its surface. The stereoscopic display unit 11 generates, in the parallax barrier display layer, a parallax barrier having a pattern in which an optical transmissive component and an optical shielding component are alternately arranged in a predetermined pitch. The stereoscopic display unit 11 also alternately arranges and displays reed-shaped image fragments of left and right images on an image display surface in a lower layer of the parallax barrier display layer. Thereby, a viewer can perceive a stereoscopic effect of an image.

The CPU 40 totally controls the entire operations of the camera 2. The CPU 40 is connected to a ROM 51. The ROM 51 stores control programs with which the CPU 40 executes various processing.

A focus adjustment unit 33 calculates a first AF evaluation value and a second AF evaluation value from the first image data and the second image data stored in the RAM 43, respectively. The first and the second AF evaluation values are calculated by integrating a high-frequency component of a luminance value, which is outputted from a high-pass filter, with respect to a first AF area corresponding to the first image data or a second AF area corresponding to the second image data, and the first and the second AF areas are specified by the CPU 40 in each of the first and the second image data (The AF area is, for example, a central area of the image or an area in which a face and other certain kind of objects are present which are detected by the CPU 40 in the image). The first and the second AF evaluation values represent a degree of sharpness of the first and the second image data, respectively.

The focus adjustment unit 33 moves the focus lens of the first imaging unit 1a or the second imaging unit 1b from closest to infinity at intervals of a predetermined step in a predetermined range (hereafter, referred to as an AF search range). The focus adjustment unit 33 determines a search direction which is a moving direction of the lens. Specifically, when the CPU 40 is instructed to set a portrait mode or a macro mode via a mode switch, the focus adjustment unit 33 determines that the search direction is a direction from closest to infinity (a first search direction). When the CPU 40 is instructed to set a landscape mode via the mode switch, the focus adjustment unit 33 determines that the search direction is a second direction from infinity to closest.

Figure 2:
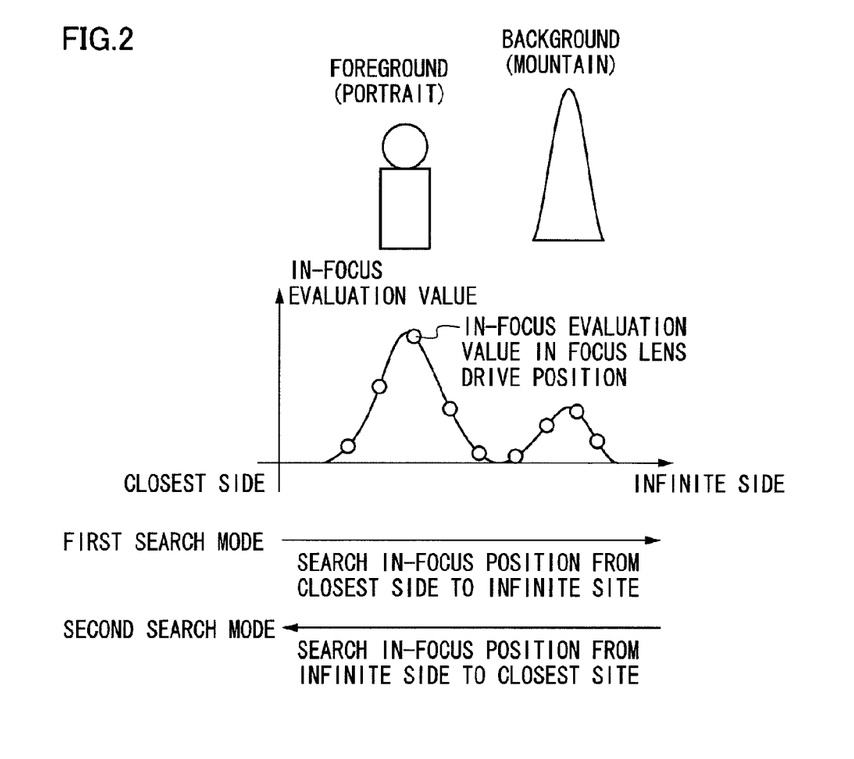
FIG. 2 is an exemplary diagram showing AF evaluation values according to subject positions.

As shown in FIG. 2, in the case of the portrait mode or the macro mode, a subject is present on the closest side, while, in the case of the landscape mode, a subject is present on the infinity side. Determining the search direction in the way as described above prevents erroneous detection of a small peak of AF evaluation value as an in-focus position, and provides faster focusing processing.

When detecting the maximum value among the first AF evaluation values and the maximum value among the second AF evaluation values, which correspond to each moving position along the determined search direction, the focus adjustment unit 33 stops moving the focus lens of the first imaging unit 1a or the second imaging unit 1b. Then, the focus adjustment unit 33 moves the first focus lens to a focus lens position of the first imaging unit 1a (a first in-focus position) corresponding to the detected maximum value among the first AF evaluation values. The focus adjustment unit 33 also moves the second focus lens to a focus lens position of the second imaging unit 1b (a second in-focus position) corresponding to the maximum value among the second AF evaluation values which correspond to each moving position. The focusing of the first imaging unit 1a and the second imaging unit 1b may be controlled individually. Alternatively, a result of the focusing control of one of the imaging units may be reflected on the focusing control of the other imaging unit.

An integration unit 73 detects luminance of the subject (measure brightness of the subject) based on each of the first and the second image data stored in the RAM 43. The subject luminance values detected from the first and the second image data are set to a first photometric value and a second photometric value, respectively. Specifically, the integration unit 73 divides the entire imaging area into 8×8=64 areas, for example, and integrates luminance components with respect to each of the R, G, B signals for each divided area based on the first or the second image data stored in the RAM 43. The integration values, an aperture value of the diaphragm at that time, and a shutter speed of an electronic shutter are used to calculate photometric values for each divided area at the time of having standard imaging sensitivity.

The integration unit 73 detects a first white balance (WB) value and a second WB value based on each of the first and the second image data stored in the RAM 43. A scheme for calculating an exposure value may be any scheme such as the spot metering, the weighted averaging metering, or the averaging metering. The first and the second photometric values, the first and the second WB values, and the first and the second AF evaluation values resulting from the calculation are sent to the CPU 40, and are used for control of the auto exposure (AE), the auto white balance (AWB), and the auto focus (AF) of the first imaging unit 1a and the second imaging unit 1b.

The CPU 40 retrieves for reference, from the ROM 51, a program diagram defining relationship of a photometric value, an aperture value, a sensitivity, and a shutter time with one another, and sets, for exposure control, an aperture value and a sensitivity corresponding to each of the first and the second photometric values detected by the integration unit 73 to the diaphragm and the image sensor, respectively.

Figure 3A:
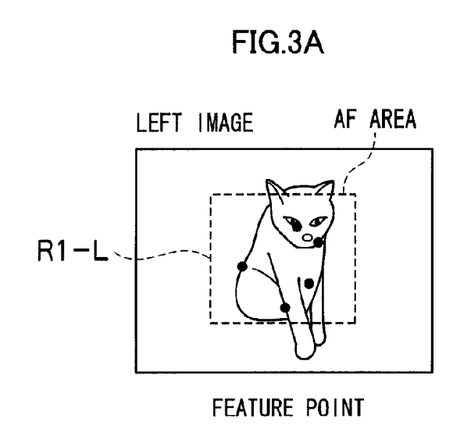
FIGS. 3A and 3B are exemplary diagrams showing feature points and corresponding points.

A feature point extraction unit 82 extracts a plurality of feature points (xi, yi) ($1 < i \leq n$, where n represents the number of the feature points) from an extracted area R1-L, which has a predetermined position, a predetermined shape, and a predetermined size, in an image obtained from a reference imaging unit having the focus lens position set to the in-focus position, that is, in the second image data in focus, which is obtained from the second imaging unit 1b having the second focus lens set to the second in-focus position (see FIG. 3A). The predetermined shape and the predetermined size are previously stored in the ROM 51. However, they may be changed by an instruction from the CPU 40 or an operating unit 10. For example, the extracted area R1-L has a rectangle shape and the 16×16 pixel size, but is not limited to this. The extracted area R1-L is not limited to be in a rectangle shape, but may be in other shape such as a circle or an ellipse. Any size of the extracted area R1-L is also possible.

At least the extracted area R1-L overlaps an AF area of the reference imaging unit, that is, the second AF area. Preferably, the extracted area R1-L is included by the second AF area, and more preferably, the extracted area R1-L matches the second AF area. The position of the second AF area may be changed. Therefore, the feature point extraction unit 82 may determine the extracted area R1-L based on position information of the second AF area inputted from the focus adjustment unit 33.

The feature point is a point (pixel) having a strong signal gradient along a plurality of directions, and can be extracted by using the method by Harris or the method by Shi-Tomasi, for example. Feature points may be extracted from the first image data, and corresponding points may be extracted from the second image data. In other words, the reference imaging unit may be the first imaging unit 1a, and is not always necessary to be the second imaging unit 1b.

Figure 3B:
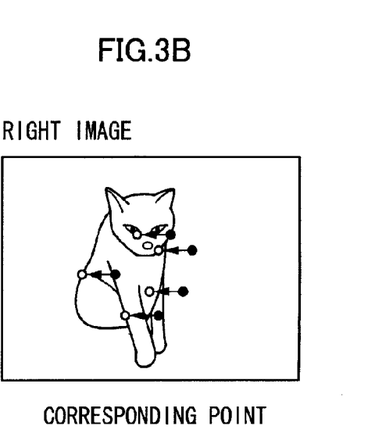

A corresponding point detection unit 83 extracts corresponding points (Xi, Yi) in the first image data, each of which corresponds to each feature point (xi, yi) extracted from the second image data, from an image of an in-focus imaging system to be adjusted, that is, from the first image data obtained from the first imaging unit 1a having the first focus lens set to the first in-focus position (See FIG. 3B). A horizontal component of a line segment between the feature point and the corresponding point is an amount of parallax. When there exists a plurality of pairs of the feature point and the corresponding point, each amount of parallax corresponding to each of the pairs is detected.

Any method of extracting the corresponding points is possible. Typical methods include a method in which image information in a window mainly having feature points is used as a template and template matching is performed, and the Lucas-Kanade method. However, this embodiment is not particularly limited to these.

A parallax amount processing unit 100 detects an amount of parallax di between the first and the second image data, each of which is in focus, based on the pair of the feature point (xi, yi) and the corresponding point (Xi, Yi). In the case of a compound-eye imaging device which is provided with two imaging systems arranged on either side along the horizontal line, an amount of parallax at a position of a feature point is expressed as di=Xi-xi. A process performed by the parallax amount processing unit 100 will be described below in detail. The parallax amount processing unit 100 is provided with an arithmetic device such as a one-chip microcomputer. Alternatively, the CPU 40 may serve as the parallax amount processing unit 100.

Figure 4:
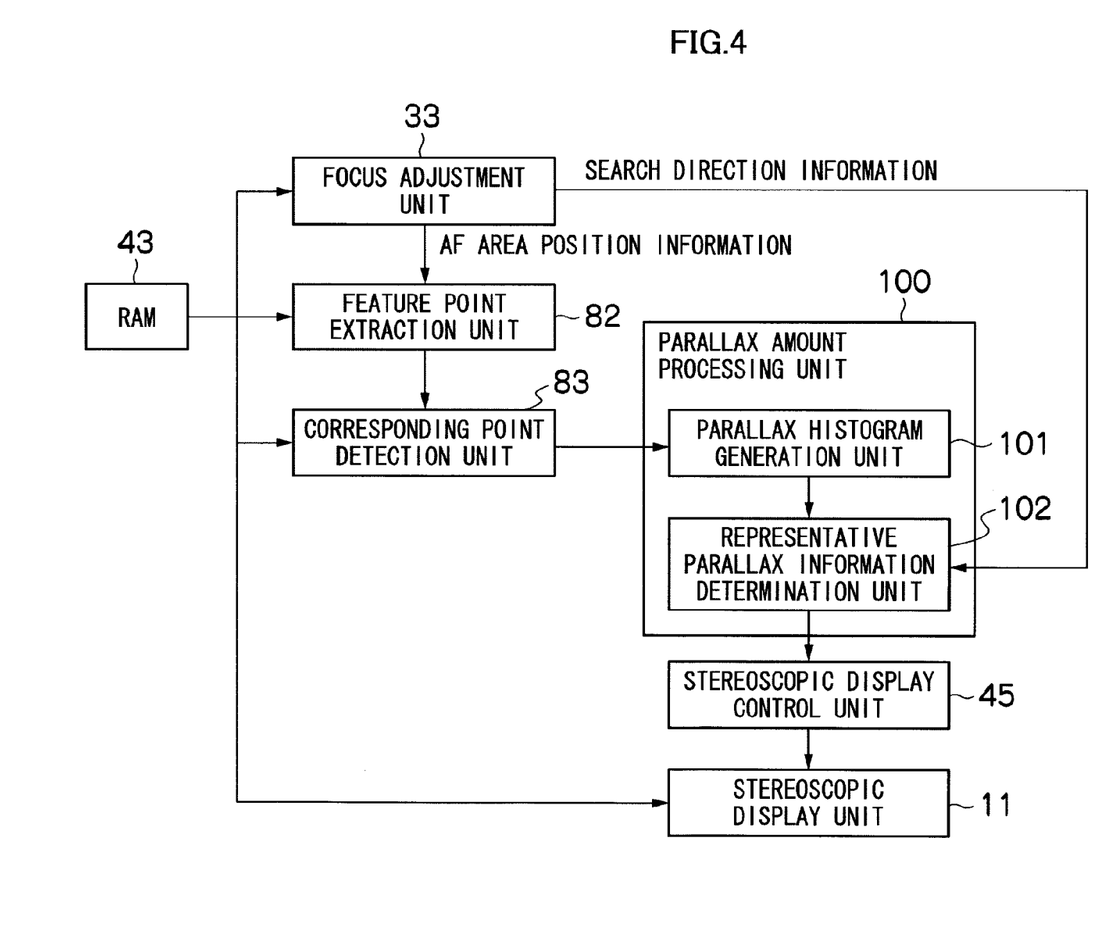
FIG. 4 is a detailed block diagram of a parallax amount processing unit.

FIG. 4 is a detailed block diagram of the parallax amount processing unit 100. The parallax amount processing unit 100 includes a parallax histogram generation unit 101 and a representative parallax information determination unit 102.

The parallax histogram generation unit 101 calculates an amount of parallax for each pair of the feature point and the corresponding point based on the feature point extracted by the feature point extraction unit 82 and the corresponding point, which is extracted by the corresponding point detection unit 83, corresponding to the feature point. This calculation of an amount of parallax is performed for each pair of the feature point and the corresponding point. Since each pair has a different distance from the camera 2 to the subject, an amount of parallax for each pair has a different value. That is, even if left and right images are in focus, the amounts of parallax between the images are not the same when there exists a plurality of pairs.

The parallax histogram generation unit 101 generates a frequency distribution of parallax amount (a parallax histogram) for each pair. The vertical axis of the histogram represents a frequency (the number of times), and the horizontal axis represents a variable amount, that is, an amount of parallax (See FIG. 5). Any width of a class (bin) of the parallax histogram is possible.

The representative parallax information determination unit 102 checks a frequency of parallax amount stored in each bin of the parallax histogram, and determines significance of the bin. Specifically, the representative parallax information determination unit 102 determines that the bin is significant if it satisfies f>th2, where f represents a frequency and th2 represents a threshold previously stored in the ROM 51, and determines that the bin is non-significant if it satisfies f≦th2. The value of th2 may be a fixed value or a value calculated according to a predetermined calculation formula. For example, th2 may be 50% of the number of corresponding points detected by the corresponding point detection unit 83.

The representative parallax information determination unit 102 receives, from the focus adjustment unit 33, the search direction determined by the focus adjustment unit 33, and repeats determination of significance of each bin according to the search direction. That is, when the focus adjustment unit 33 determines that the search direction is the first search direction, the representative parallax information determination unit 102 sequentially determines significance of each bin from a bin on the closest side (a bin having the maximum amount of parallax) to a bin on the infinity side (a bin having the minimal amount of parallax). When the focus adjustment unit 33 determines that the search direction is the second search direction, the representative parallax information determination unit 102 sequentially determines significance of each bin from a bin on the infinity side (a bin having the minimal amount of parallax) to a bin on the closest side (a bin having the maximum amount of parallax) (See FIG. 5). The representative parallax information determination unit 102 repeats determination of significance of each bin according to the search direction determined by the focus adjustment unit 33, and determines an amount of representative parallax based on amounts of parallax in a significant bin which is first determined to be significant in the search direction. The representative parallax information determination unit 102 stops determination of significance of subsequent bins when the significant bin is detected.

Figure 5:
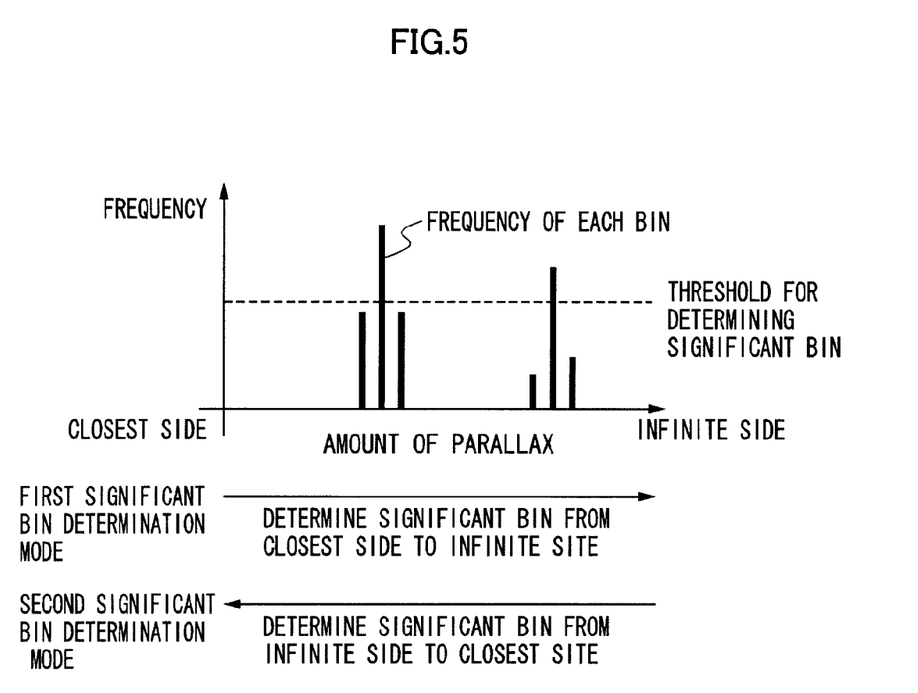
FIG. 5 is an exemplary diagram showing a parallax histogram.

For example, when the width of a bin is two pixels, and a median of the bin is at +12 pixels, the frequency of the bin is equal to the number of pairs of a feature point and a corresponding point which have an amount of parallax in a range from +11 to +13. An amount of representative parallax may be set at an median of the significant bin, may be set at an average of all amounts of parallax in the significant bin, or may be set at an average of the amounts of parallax in the range from m-α to m+α, where m represents the median of the significant bin and α is a constant.

The search direction for an in-focus position is equal to the direction of determination of significance of the parallax histogram, and stopping of search for an in-focus position and stopping of determination of significance of the parallax histogram are performed in a similar way. Thereby, an amount of representative parallax can be set at an amount of parallax of a subject in an optimum focus position.

Figure 6:
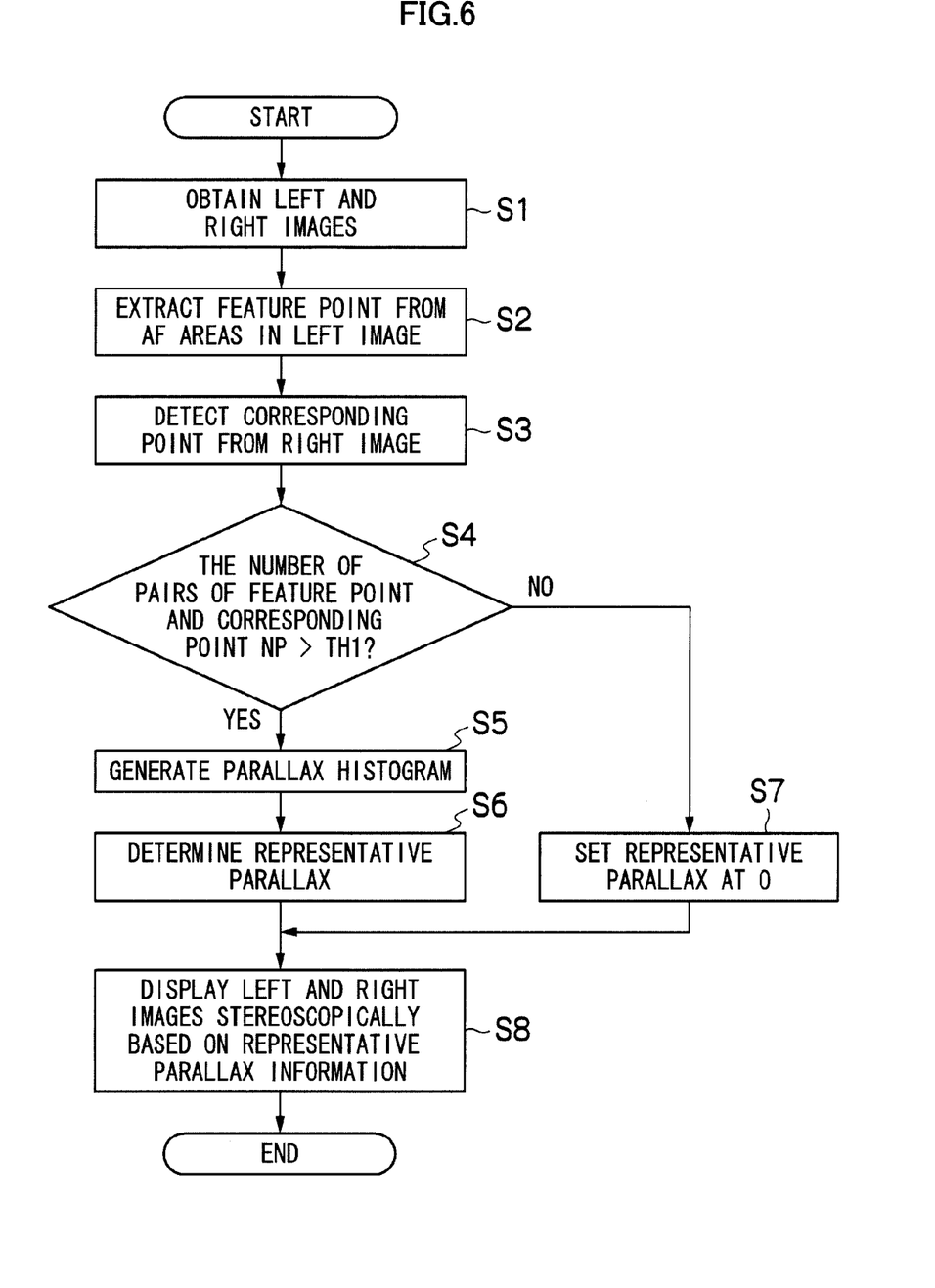
FIG. 6 is an abbreviated flowchart of a stereoscopic image display process.

FIG. 6 is an abbreviated flowchart of a stereoscopic image display process. Execution of this process is controlled by the CPU 40. A program for instructing the CPU 40 to execute the process is stored in the ROM 51. Execution of the following process by one or more imaging devices can be controlled from a personal computer or the like which has a hardware configuration equivalent to the CPU 40. Therefore, the CPU 40 is not necessary to be included in the camera 2.

In S1, the process controls the focus adjustment unit 33 to determine the search direction. While the focus lenses of the first imaging unit 1*a* and the second imaging unit 1*b* are moved step-by-step by a predetermined step along the determined search direction, the first and the second image data are obtained into the RAM 43 at each moving position. To be exact, the movement of the focus lenses of the first imaging unit 1*a* and the second imaging unit 1*b* by the predetermined step, and the imaging of the first imaging unit 1*a* and the second imaging unit 1*b* at the moving position are performed along the respective determined search directions, and the movement is performed until the maximum values of the first AF evaluation value and the second AF evaluation value are detected first. When the maximum values of the first AF evaluation value and the second AF evaluation value are detected first, the focus lenses are controlled so as to stop moving the focus lenses along the search direction to a next position which has a value less than the maximum value detected at the current position, and the imaging is also stopped.

In S2, the process controls the feature point extraction unit 82 to detect feature points from an image obtained from a reference imaging unit having a focus lens at an in-focus position, that is, from the second image data obtained from the second imaging unit 1*b* in focus.

In S3, the process controls the corresponding point detection unit 83 to detect corresponding points from an image obtained from an imaging unit to be adjusted which has a focus lens at an in-focus position, that is, from the first image data obtained from the first imaging unit 1*a* in focus.

In S4, the process determines whether the total number of pairs of a feature point and a corresponding point exceeds the predetermined threshold th1. If it exceeds th1, the process proceeds to S5 If not, the process proceeds to S7. The predetermined threshold th1 is stored in the ROM 51. The value of th1 may be a fixed value, or may be a value calculated according to a predetermined calculation formula. For example, th1 is set at 50% of the number of the feature points detected by the feature point extraction unit 82.

In S5, the process controls the parallax histogram generation unit 101 to generate a histogram of parallax amount.

In S6, the process controls the representative parallax information determination unit 102 to determine an amount of representative parallax from bins of the histogram of parallax amount. To be exact, the process determines significance of each bin in the order along the search direction determined by the focus adjustment unit 33, and determines the amount of representative parallax from amounts of parallax in a bin which is first determined to be significant. As described above, any way of determination is possible. The amount of representative parallax is determined from a median of the significant bin, an average or a median value of all amounts of parallax in the significant bin, or the like. The process controls to stop determining significance of subsequent bins when a bin next to the bin first determined to be significant along the search direction has a value less than the value of the first determined significant bin.

In S7, the process determines that the amount of representative parallax is set to 0. When a current extracted area R1-L is not included by the entire first AF area, the process may set any area, which is larger than the current extracted area R1-L and is included by the first AF area, to a new extracted area R1-L, return back to S2, and extract feature points in the new extracted area R1-L. This process is effective when the current extracted area R1-L is too small to extract enough feature points.

Figure 7:
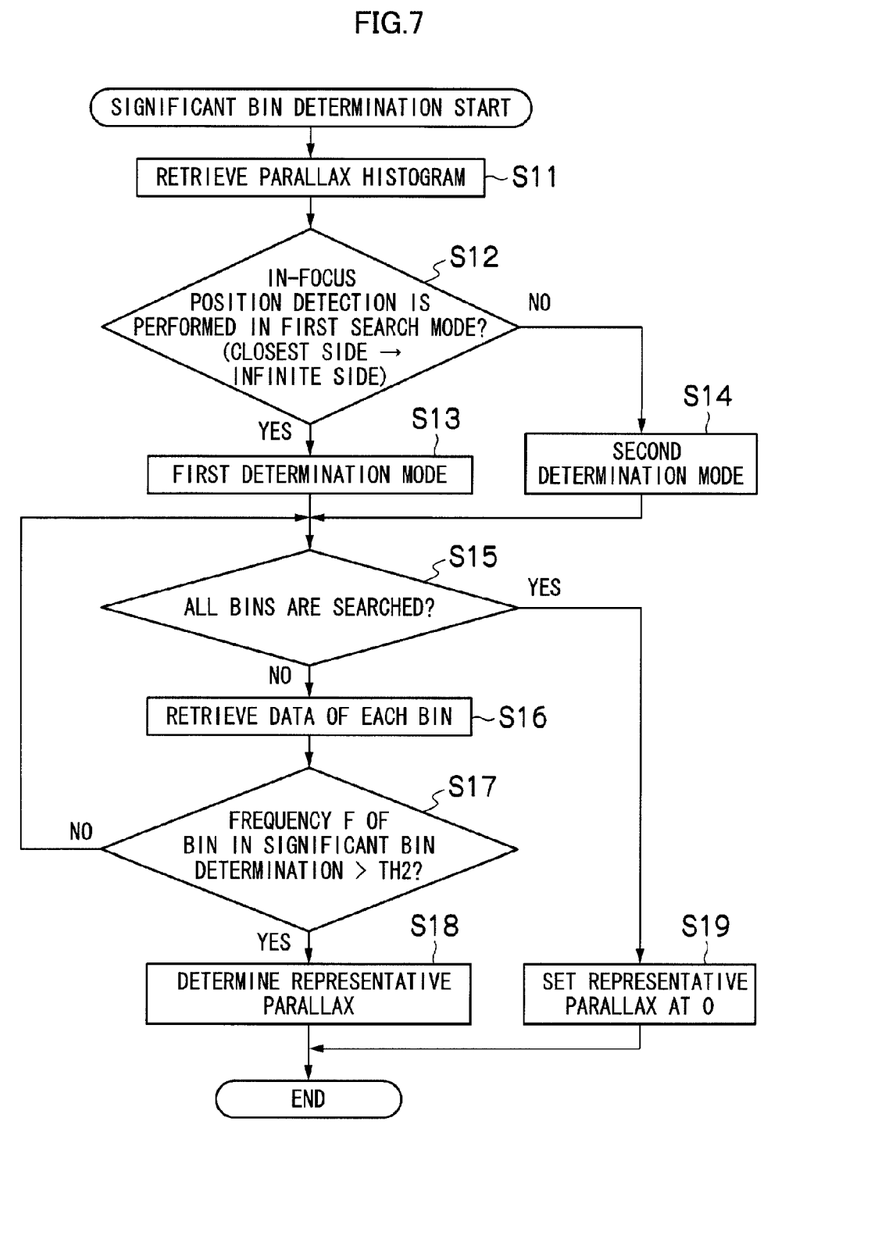
FIG. 7 is a flowchart of a significant bin determination process.

FIG. 7 is a flowchart showing a significant bin determination process. Execution of this process is controlled by the CPU 40. A program for instructing the CPU 40 to execute the process is stored in the ROM 51. Execution of the following process can be controlled from a personal computer or the like which has a hardware configuration equivalent to the CPU 40. Therefore, the CPU 40 is not necessary to be included in the camera 2.

In S11, the process controls the parallax histogram generation unit 101 to retrieve generated histogram of parallax amount to the RAM 43.

In S12, the process determines whether the search direction determined by the focus adjustment unit 33 is the first search direction or the second search direction. If it is determined that the search direction is the first search direction, the process proceeds to S13. If it is determined that the search direction is the second search direction, the process proceeds to S14.

In S13, the process sets a first determination mode to the representative parallax information determination unit 102. When the first determination mode is set, the representative parallax information determination unit 102 determines significance of each bin in the order along the first search direction (the order from a bin having the maximum amount of parallax to a bin having the minimal amount of parallax).

In S14, the process sets a second determination mode to the representative parallax information determination unit 102. When the second determination mode is set, the representative parallax information determination unit 102 determines significance of each bin in the order along the second search direction (the order from a bin having the minimal amount of parallax to a bin having the maximum amount of parallax).

In S15, the process determines whether all of the bins in the histogram are non-significant. If it is Yes (if it is determined that all of the bins are non-significant), the process proceeds to S19. If it is No (if it is not determined that all of the bins are non-significant), the process proceeds to S16.

In S16, the process retrieves a frequency (number of times) f of a bin in the order along the search direction corresponding to the determination mode which is set in S13 or S14.

In S17, the process determines whether the retrieved frequency f is greater than the predetermined threshold th2 or not. If it is Yes, the process proceeds to S18. If it is No, the process proceeds to S15. As described above, the threshold th2 may be set at 50% of the total number of the detected corresponding points, for example.

In S18, the process determines an amount of representative parallax based on amounts of parallax in a bin which is determined to have the retrieved frequency f more than the predetermined threshold th2, that is, the significant bin.

In S19, the process determines that the amount of representative parallax is set at 0. As in S7 described above, when the extracted area R1-L is enlarged, the process extracts feature points and corresponding points and generates a histogram again for the enlarged extracted area R1-L, and returns back to S11. Then, the process determines significance of each bin in the newly generated histogram. If the result of the determination is also that the histogram has no significant bin, the process may proceed to S19.

Figure 8:
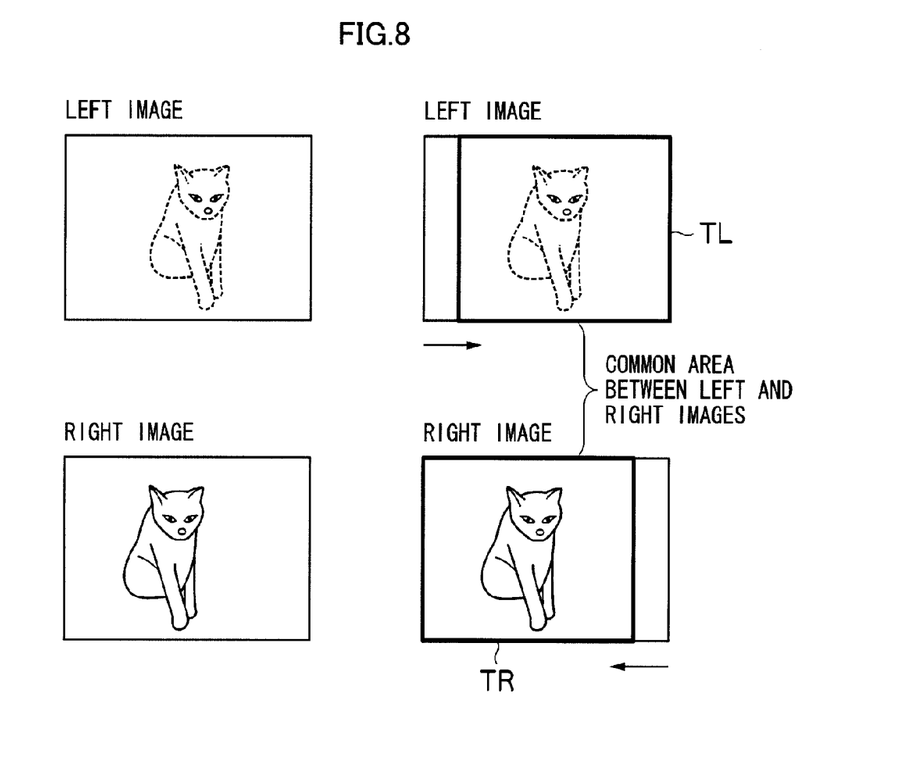
FIG. 8 is an exemplary diagram showing clipping ranges of left and right images.

After this process, the stereoscopic display control unit 45 determines clipping ranges of the first image data and the second image data based on the determined amount of representative parallax. For example, if a left image (the second image data) is a reference, when an amount of representative parallax is −24, a right image (the first image data) is misaligned with respect to the left image by 24 pixels to the left. To adjust this, for example, the stereoscopic display control unit 45 determines a clipping range TL of the left image and a clipping range TR of the right image to eliminate this misalignment of 24 pixels. The stereoscopic display control unit 45 clips images from the first image data and the second image data according to the determined clipping ranges, and outputs the clipped images to the stereoscopic display unit 11. FIG. 8 shows an example of the clipping range TL of the left image and the clipping range TR of the right image.

Figure 9A:
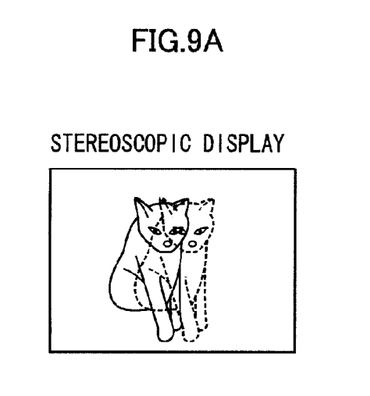
FIGS. 9A and 9B are exemplary diagrams showing a conventional stereoscopic image and an embodiment of the present invention, respectively.
Figure 9B:
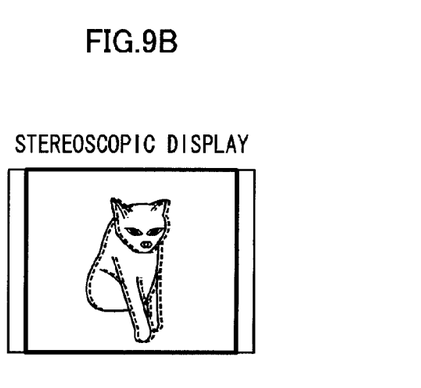

In a conventional method, horizontal parallax is sometimes too large since it depends on a distance of a subject, and an image therefore is viewed as an overlapping view in which a fusional limit between left and right images is exceeded (See FIG. 9A). On the other hand, according to the embodiment, images are clipped for display based on detected representative parallax. Therefore, parallax of a main subject in focus can be reduced (See FIG. 9B).

What is claimed is:

1. A stereoscopic imaging device, comprising:
an imaging unit performing, by using an imaging element, optoelectronic conversion of a subject image formed via each of a reference optical system and a separate non-reference optical system, and outputting a plurality of viewpoint images with parallaxes different from each other;
a reference focusing evaluation area defining unit defining a reference focusing evaluation area corresponding to one of the viewpoint images which is from the reference optical system;
a subject information determination unit determining subject information about whether a distance from the imaging unit to a subject in the reference focusing evaluation area is long or short;
a focusing control unit detecting peak positions each of which is a focus position having a local maximum contrast in the reference focusing evaluation area defined by the reference focusing evaluation area defining unit in the viewpoint image from the reference optical system while changing the focus position of the reference optical system, determining an in-focus position corresponding to the subject among the peak positions based on the subject information determined by the subject information determination unit, and moving the focus position of the reference optical system to the determined in-focus position:
a feature point extraction area defining unit defining a feature point extraction area corresponding to the viewpoint image from the reference optical system, which has the focus position moved to the in-focus position, based on the reference focusing evaluation area;
a feature point extraction unit extracting a feature point from the feature point extraction area defined in the viewpoint image of the reference optical system by the feature point extraction area defining unit;
a corresponding point extraction unit extracting a corresponding point corresponding to the feature point, which is extracted by the feature point extraction unit, from the other of the viewpoint images which is froth the non-reference optical system;
a parallax amount calculation unit calculating an amount of parallax for each pair of the feature point extracted by the feature point extraction unit and the corresponding point extracted by the corresponding point extraction unit;
a histogram generation unit generating a histogram, which shows distribution of the amount of parallax for each pair, based on the amount of parallax for each pair of the feature point and the corresponding point which is calculated by the parallax amount calculation unit;
a determining unit determining a significant class, which is a class having the amount of parallax corresponding to the subject, based on the subject information determined by the subject information determination unit and a frequency in the histogram generated by the histogram generation unit; and
a representative parallax amount determination unit determining an amount of representative parallax based on the significant class determined by the determining unit.

2. The stereoscopic imaging device according to claim 1, wherein
the subject information determination unit sets an imaging mode to the subject information,
the focusing control unit determines, according to the imaging mode, the search direction, in which the focus position in the reference optical system is changed, to be one of a direction from the closest side to the infinity side and a direction from the infinity side to the closest side, and determines a peak position, which is first detected while the focus position of the reference optical system is changed in the determined search direction, to be the in-focus position, and
the determining unit repeats determination of significance of each class in the histogram in the order along the determined search direction based on the frequency of each class, and determines a class, which is first determined to be significant along the determined search direction, to be a significant class.

3. The stereoscopic imaging device according to claim 2, wherein, in response to the detection of the significant class, the determining unit stops the determination of significance of each class subsequent to the significant class along the determined search direction.

4. The stereoscopic imaging device according to claim 2, wherein the determining unit determines significance of each class according to whether the frequency of each class exceeds a predetermined threshold or not.

5. The stereoscopic imaging device according to claim 1, wherein, when the imaging mode is a portrait mode or a macro mode, the focusing control unit determines that the search direction is a direction from the closest side to the infinity side.

6. The stereoscopic imaging device according to claim 1, wherein, when the imaging mode is a landscape mode, the focusing control unit determines that the search direction is a direction from the infinity side to the closest side.

7. The stereoscopic imaging device according to claim 1, wherein the feature point extraction area defining unit defines the feature point extraction area for a part or all of the reference focusing evaluation area.

8. The stereoscopic imaging device according to claim 1, further comprising:
a clipping unit determining a clipping range of the viewpoint image from the reference optical system and a clipping range of the viewpoint image from the non-reference optical system so as to eliminate misalignment between the viewpoint images which is shown as the amount of representative parallax determined by the representative parallax amount determination unit, and clipping images according to the determined clipping ranges; and
an output unit outputting a stereoscopic image based on the images clipped by the clipping unit.

9. A stereoscopic imaging method by which an imaging device, which performs, by using an imaging element, opto-electronic conversion of a subject image formed via each of a reference optical system and a separate non-reference optical system, and outputs a plurality of viewpoint images with parallaxes different from each other, executes the steps of:
defining a reference focusing evaluation area corresponding to one of the viewpoint images which is from the reference optical system;
determining subject information about whether a distance from the imaging device to a subject in the reference using evaluation area is long or short;
detecting peak positions each of which is a focus position having a local maximum contrast in the defined reference focusing evaluation area in the viewpoint image from the reference optical system while changing the focus position of the reference optical system, determining an in-focus position corresponding to the subject among the peak positions based on the determined subject information, and moving the focus position of the reference optical system to the determined in-focus position;
defining a feature point extraction area corresponding to the viewpoint image from the reference optical system, which has the focus position moved to the in-focus position, based on the reference focusing evaluation area;
extracting a feature point from the feature point extraction area which is defined in the viewpoint image of the reference optical system;
extracting a corresponding point corresponding to the extracted feature point from the other of the viewpoint images which is from the non-reference optical system;
calculating an amount of parallax for each pair of the extracted feature point and the extracted corresponding point;
generating a histogram, which shows distribution of the amount of parallax for each pair, based on the calculated amount of parallax for each pair of the feature point and the corresponding point;
determining a significant class, which is a class having the amount of parallax corresponding to the subject, based on the determined subject information and a frequency in the generated histogram; and
determining an amount of representative parallax based on the determined significant class.

10. A non-transitory programmable storage medium tangibly embodying a program of machine-readable instructions executable by a digital processing apparatus to perform in the imaging device an imaging method according to claim 9.

* * * * *